United States Patent
Yuan et al.

[11] Patent Number: 5,226,477
[45] Date of Patent: Jul. 13, 1993

[54] SYSTEM FOR RECOVERY AND UTILIZATION OF EXHAUST HEAT FROM A REFORMER

[75] Inventors: Hanlong Yuan; Jingcheng He; Dingquan Liu; Zisong Zheng; Yigang Yang; Zuowei Hu; Xiaoying Li, all of Madian Town, China

[73] Assignee: China Petro-Chemical Corporation, Beijing, China

[21] Appl. No.: 741,119

[22] Filed: Aug. 5, 1991

[30] Foreign Application Priority Data

Aug. 3, 1990 [CN] China .................. 90217108.9

[51] Int. Cl.⁵ .................. F28F 3/12; F28D 15/02
[52] U.S. Cl. .................. 165/169; 165/104.14; 165/909; 422/202; 422/203
[58] Field of Search .................. 165/104.14, 169, 909; 422/202, 203, 204; 48/127.9

[56] References Cited

U.S. PATENT DOCUMENTS

| | | | |
|---|---|---|---|
| 2,932,091 | 4/1960 | Day .................. | 165/169 |
| 3,466,152 | 9/1969 | Yamamoto et al. .................. | 422/203 |
| 3,498,752 | 3/1970 | Kuo .................. | 422/202 |
| 3,556,738 | 1/1971 | Schober .................. | 422/203 |
| 4,137,965 | 2/1979 | Fallon, Jr. et al. .................. | 165/909 |
| 4,212,652 | 7/1980 | duPont .................. | 422/203 |
| 4,249,594 | 2/1981 | Elkins et al. .................. | 165/909 |
| 4,252,553 | 2/1981 | Pircon et al. .................. | 423/242 |
| 4,315,893 | 2/1982 | McCallister .................. | 422/200 |
| 4,405,013 | 9/1983 | Okamoto .................. | 165/909 |
| 4,416,325 | 11/1983 | Barratt et al. .................. | 165/909 |
| 4,478,814 | 10/1984 | Kesten et al. .................. | 423/650 |
| 4,482,523 | 11/1984 | Peterson .................. | 422/203 |
| 4,548,258 | 10/1985 | Nelson et al. .................. | 165/104.21 |
| 4,552,741 | 11/1985 | Melchior .................. | 422/204 |
| 4,670,187 | 6/1987 | Schurmans et al. .................. | 165/104.14 |
| 4,746,329 | 5/1988 | Christner et al. .................. | 422/203 |
| 4,861,348 | 8/1989 | Koyama et al. .................. | 422/203 |
| 4,875,522 | 10/1989 | Noda et al. .................. | 165/104.14 |
| 5,086,831 | 2/1992 | Paikert et al. .................. | 165/104.14 |

*Primary Examiner*—John Rivell
*Assistant Examiner*—L. R. Leo
*Attorney, Agent, or Firm*—Flehr, Hohbach, Test, Albritton & Herbert

[57] ABSTRACT

This invention relates to a system for recuperation and utilization of exhaust heat from a reformer, in which a plurality of arc passageways are formed respectively on the opposite outside walls of the reformer body with a plurality of arc-shaped steel sheet or zinc-plated steel sheet, said arch passageways together with the bottom chamber under the reformer body serve as preheating duct, and at least one air inlet above each passageway is disposed above the top of the reformer. Under the effect of a blower, the air above the reformer top passes through the said preheating duct, and absorbs the heat dispersed from the reformer body. The preheated air makes indirect heat exchange with the flue gas through a heat pipe excharger. The temperature of the air after heat exchange rises from the environmental to about 220° C. and the air is then introduced to the reformer and auxiliary boiler for combustion. The temperature of the flue gas drops from about 300° C. to about 160° C. after heat exchange, and then the flue gas exhausts to the atmosphere through a chimney.

7 Claims, 4 Drawing Sheets

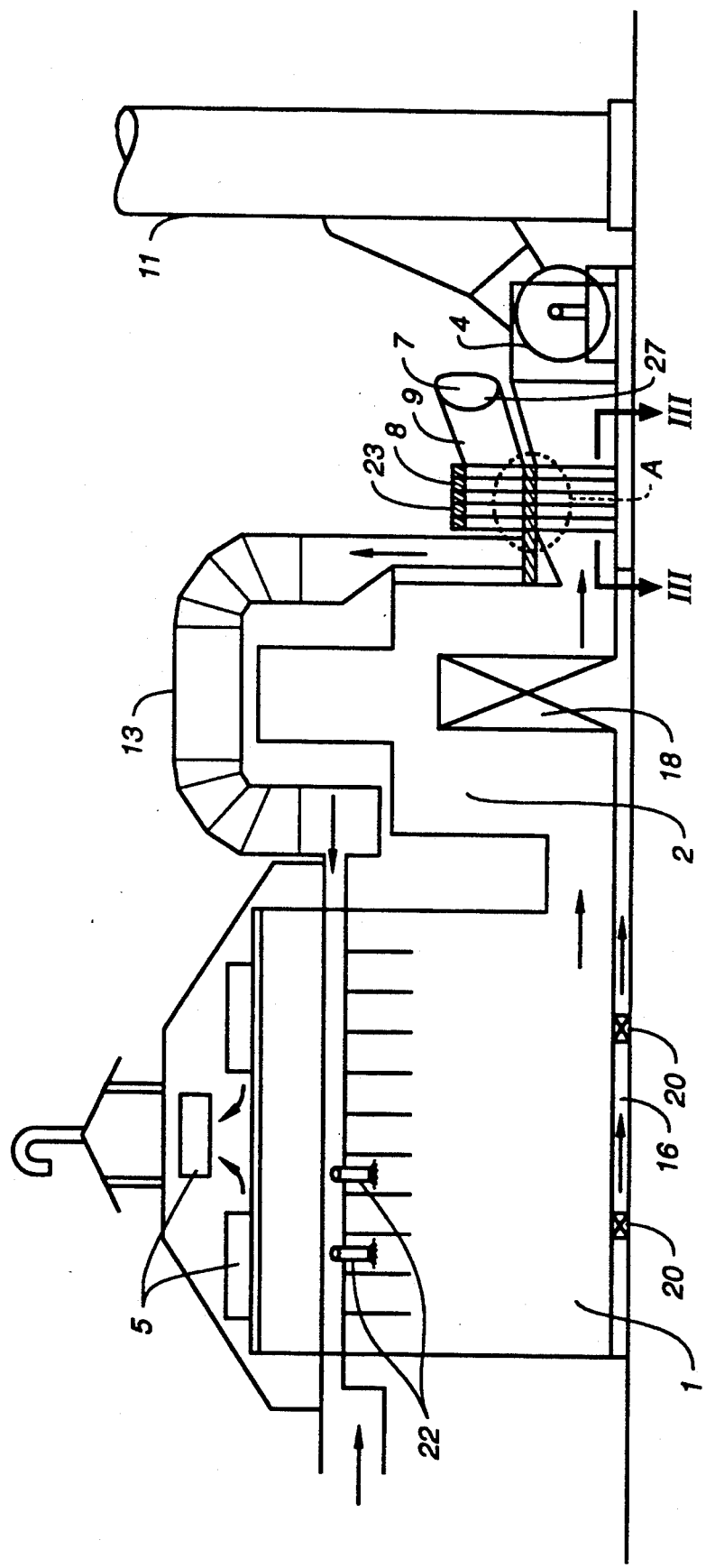
FIG._1

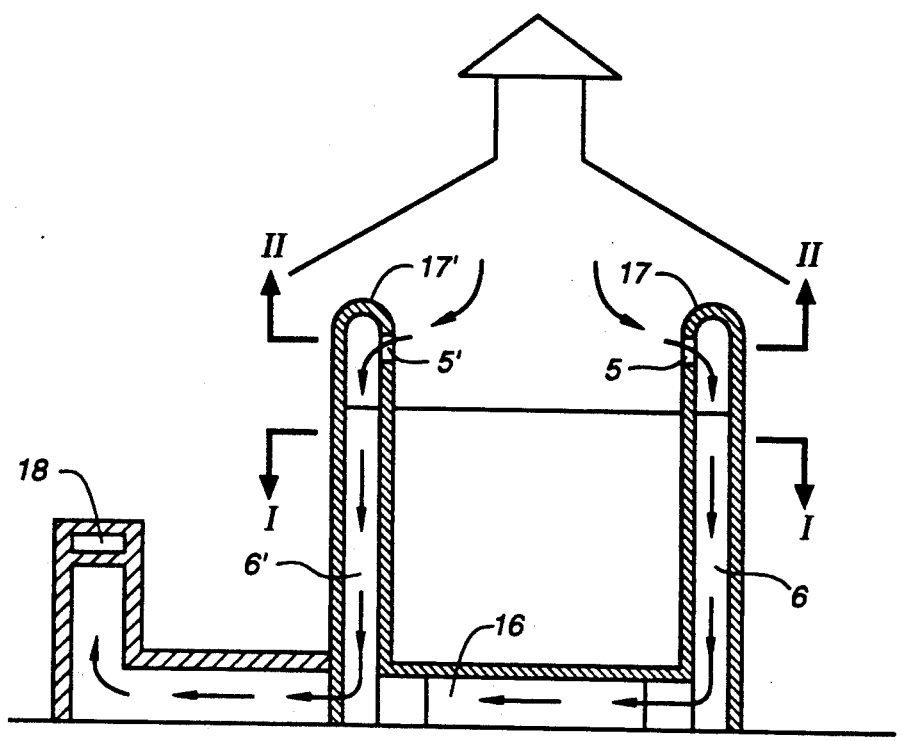
FIG._2
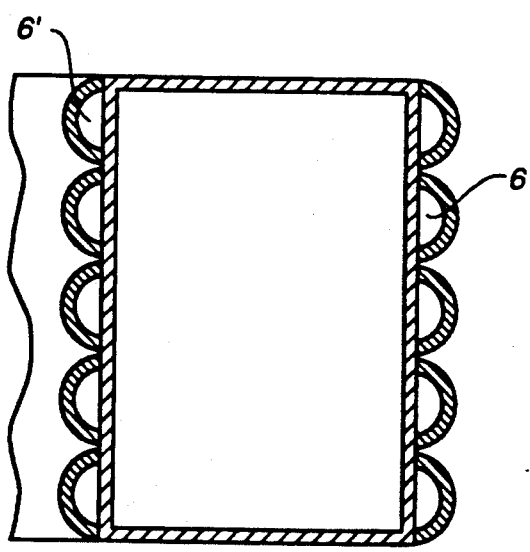
FIG._3
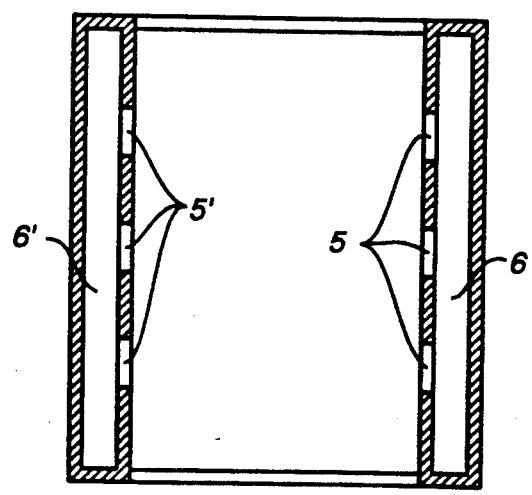
FIG._4

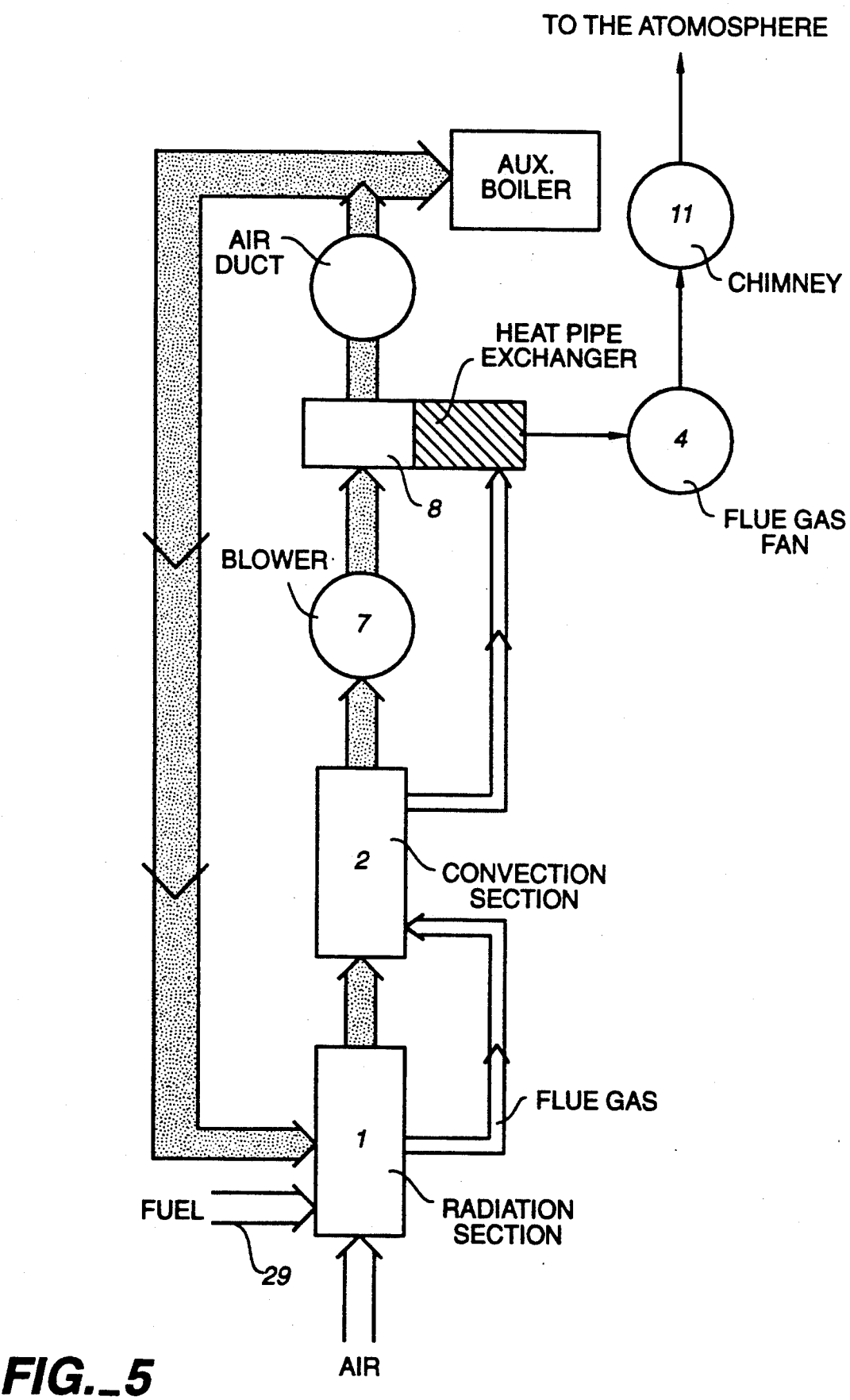
FIG._5

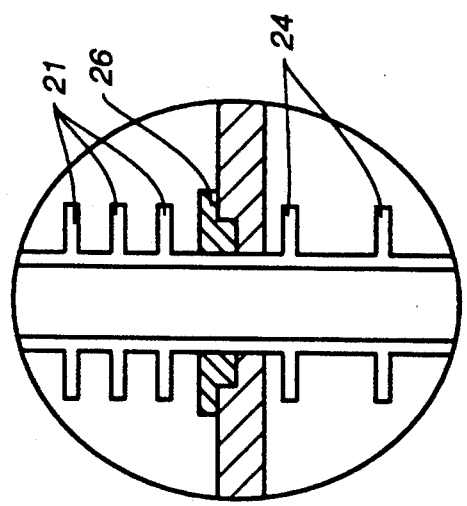
FIG._7
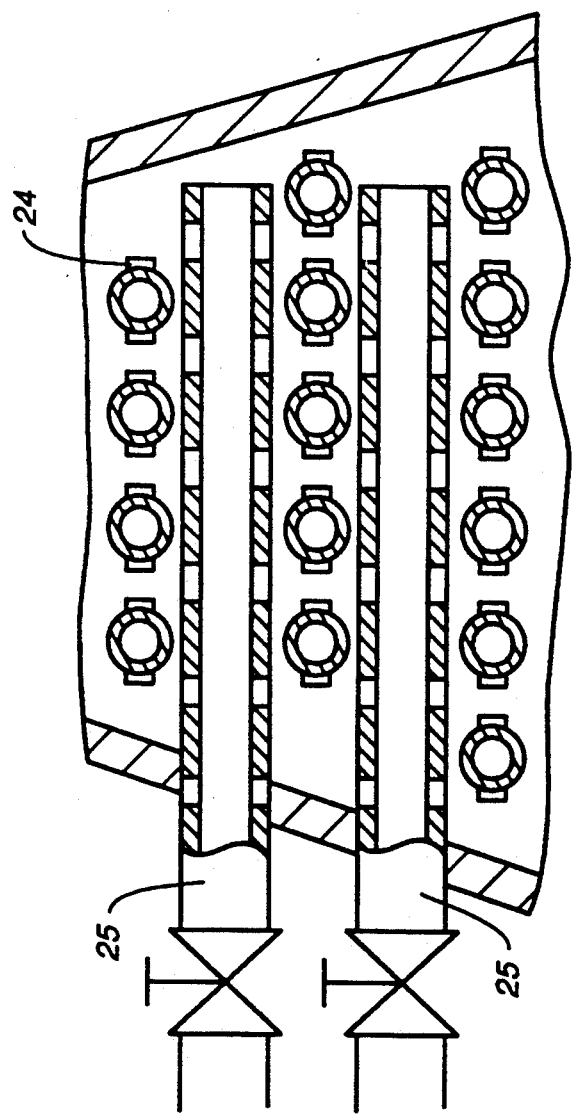
FIG._6

SYSTEM FOR RECOVERY AND UTILIZATION OF EXHAUST HEAT FROM A REFORMER

FIELD OF THE INVENTION

The invention relates to a system for recovery and utilization of exhaust heat from a reformer, particularly to a system for recovery and utilization of exhaust heat from a reformer in a large chemical ferlitizer plant.

BACKGROUND OF THE INVENTION

The energy supply in the world cannot satisfy the great demand with each passing day, and the recovery of the energy becomes more and more important. At present, the world pays much attention on recovery and utilization of the energy from, such as the boiler, the primary reformer of large chemical fertilizer plant.

The primary reformer of large chemical fertilizer plant comprises: a radiation section; a convection section; an auxiliary boiler and a common flue chimney etc. The radiation section has a configuration of box structure wherein a plurality of conversion tubes, loaded with catalysis for converting reaction of the hydrogen generation between the naphtha gas and the steam, are installed. At the top of the reformer, a plurality of burners are installed and burns vertically downward, providing the heat for the converting reaction. The flue gas passes through the lower part of the radiation section, enters into the high-temperature side of the convection section, at the top of the convection section mixes with the flue gas coming from the auxiliary boiler, and finally comes into the low-temperature side of the convection section. The temperature of the flue gas may be as high as about 300° C. when it leaves the convection section. Then the flue gas, drawn by a flue gas fan, will be exhausted through the flue chimney to the atmosphere.

As the temperature of the exhaust gas is relatively high, its direct exhaustion will cause the heat loss and the pollution of the environment. On the other hand, the wall temperature of the radiation section can be as high as from about 80°–120° C., and the environment temperature at the top of the reformer can be as high as from 50° C.–60° C.

Traditionally, a rotary air heat exchanger is preferably employed, for the primary reformer in large chemical fertilizer plants. A plurality of metal plates as heat-accumulator are disposed on the rotor of the heat exchanger. When the rotor of the air heat exchanger turns into the flue, the metal accumulator-plates absorb the heat of the flue gas, and the temperature of the metal plates increase. As the metal plates turn out from the flue and enter into the air duct, the rotor release its accumulated heat to the air and its temperature drops. The rotation of the rotor is continued and the rotor enters into the flue, the metal plates transfer the heat of flue gas to the air by alternation of the heat-absorbing and releasing of the rotor. The main disadvantages of such kind of heat exchanger are: the series leakage of the air (8% is the designed value, but a range of 12–18% is in practice); the metal plates are passed through the cold air side alternatively; the super cooling zone of the rotor can not be avoided, and it is difficult to avoid the dew point corrosion and the ash choke of the heat exchanger; the high head loss (1200–1600 Pa) due to the small gap between metal plates; power consumed by the rotor; high cost for maintenance; reformer accident caused by the stop of the rotary pre-heater, and disability to reduce the environmental temperature at the top of the reformer.

OBJECTS OF THE INVENTION

One object of this invention is to overcome the disadvantages of the prior art and to provide an exhaust-heat recovery and utilization system of reformer, wherein at the outer side of the reformer body, a plurality of passageways are constructed performing a preheating duct together with the bottom chamber of the reformer. The air, preheated at first in said duct by absorbing the heat dispersed from the reformer body, making further heat exchange with the flue gas in the heat pipes, is introduced to the reformer and auxiliary boiler for combustion, and by which means the heat efficiency of the reformer can be increased.

Another object of this invention is to reduce the temperature of the top of the radiation section of the reformer, to improve the operating conditions at the top section of the reformer.

SUMMARY OF THE INVENTION

This invention relates to a system for recovery and utilization of exhaust-heat from a reformer, which comprises a device for recovering the dispersed heat from the body of the reformer and a device for recovering the exhaust heat from the flue gas, wherein the device for recovering the dispersed heat from the body of the reformer comprises:

a plurality of arc type passageways formed on the opposite outside walls of the reformer by a plurality of arc-shaped steel sheets or zinc-plated steel sheets respectively; a steel sheet or zinc plated steel sheet sealing cover welded at the top of said passageway; at least one air inlet disposed at the inner side of said sealing cover, the arc-type passageways are connected respectively with the bottom chamber of the reformer body and extends to the convection section of the reformer, and an air outlet disposed in the convection section, and said outlet being connected with a blower;

said device for recovering the exhaust heat of the flue gas comprises:

a heat pipe exchanger disposed in the flue duct between the flue gas outlet of the convection section and the flue gas fan, the lower part of the heat pipe exchanger being disposed in the flue duct, the upper part of which being disposed in the air duct for the preheated air, the inlet of the said air duct being connected with said blower, and the outlet of the said air duct being connected with the combustion air inlets of the reformer and the auxiliary boiler.

According to this invention, the said heat pipe exchanger is constructed by carbon steel-water type heat pipe, wherein a particular sealing exhausting valve is provided, the flow passage of the flue duct for disposing said heat pipe exchanger has a alternative cross section; the thread pitches of the fins are different at both cold and hot sides of the heat pipe exchanger; between the heat pipe and the upper, middle plates are disposed sealing plates respectively; a plurality of dust blowers are disposed between the heat pipes located inside the heat pipe exchanger to-prevent the superheating and the dew-formation of the heat pipes.

BRIEF DESCRIPTION OF THE DRAWINGS

FIG. 1 is a diagrammatic view of the exhaust heat recovery system of a reformer according to this invention;

FIG. 2 is a section view of the radiation section of the reformer as shown in FIG. 1.

FIG. 3 is a section view taken along line I—I of FIG. 2.

FIG. 4 is a section view taken along line II—II of FIG. 2.

FIG. 5 is the flow chart according to the present invention.

FIG. 6 is a section view taken along line III—III of FIG. 1.

FIG. 7 is a section view of part A of FIG. 1.

DETAILED DESCRIPTION OF THE INVENTION

A detailed description is given with reference to the accompanying drawings as follows:

As shown in the figures, the reformer generally comprises; radiation section (1), convection section (2), auxiliary boiler, flue duct and chimney etc. According to this invention, the exhaust heat recovery system of a reformer comprises a device for recovering the dispersed heat from the body of the reformer and a device for recovering the exhaust heat from the flue gas. The device for recovering the dispersed heat from the body of the reformer comprises: a plurality of arc-type passageways (6,6') formed opposite outside walls of the reformer body respectively by a plurality of arc-shaped steel sheets or zinc-plated steel sheets, said arc-type passageways (6,6') being connected with the bottom chamber (16) of the reformer, which extends to the bottom of the convection section (2) as a lane path; a steel sheet or zinc-plated steel sheet sealing cover (17,17') welded separately on the top of passageway (6,6'); at least one air inlet (5,5') being disposed at the inner side of cover (17,17'); an air outlet (18) being disposed at the convection section (2); said outlet (18) being connected with a blower (7); said arc-shaped steel sheets or zinc-plated steel sheets being disposed vertically along the reformer body;

said device for recovering the exhaust heat of the flue gas comprises:

a heat pipe exchanger (8) being disposed in the flue duct between the flue gas outlet of the convection section (2) and the flue gas fan (4), the lower part of the heat pipe exchanger (8) being disposed in the flue duct, and the upper part of it being disposed in the preheated air duct (9), the inlet (27) of said duct (9) being connected with the outlet (18) through the blower (7); the outlet (13) of the said air duct (9) being connected with the combustion air inlets of the reformer and the auxiliary boiler.

According to this invention, said heat pipe exchanger (8) is carbon steel-water heat pipe exchanger.

According to the system for recovery and utilization of exhaust heat from a reformer of the present invention, in the device for recovering the dispersed heat from the body of the reformer, at least one emergency valve (20) is installed on said arc-type passageways (6,6') and on the bottom chamber (16), so as the air can enter into the passageways (6,6') through the valve to cool the reformer wall and to prevent its superheat during a sudden stop of the blower by an accident.

According to the system for recovery of the exhaust heat from a reformer of the present invention, the device for recovering the exhaust heat of flue gas uses the heat pipe exchanger (8) to recover further the exhaust heat of the flue gas.

The heat pipe exchanger is a kind of conductive element having high thermal conductivity. The cleaned metal tube is sealed at both two terminals, and vacuumized and injected with certain amounts of working substance, then a heat pipe is prepared. The heat pipes are disposed vertically, the lower part of which is occupied by the working substance. When the flue gas having high temperature passes through the lower part of the outside of said heat pipes (heating section), the working substance in the pipes absorb the heat of the flue gas and vaporized into its steam, the steam flows upward along the passage within the pipe shell to the upper part-air side (cooling section), then the steam begins to release the latent heat. After that, the heat is transferred to the air outside the pipes, the steam in the pipes is condensed into liquid and drop down along the internal walls of the pipes to the lower part located in the flue duct by gravity, then it will be heated and vaporized again. By this way, the vaporization condensation process can be kept and continued, so that the heat of the flue gas can be transferred to the air continuously. The efficiency of heat conduction by the heat pipe is high, because the heat of the working substance is transferred by way of latent heat, and the temperature of the working substance between two parts is small. According to this invention, a sealed exhaust valve (22) installed on said carbon steel-water heat pipe, so that after a long period of working, an uncondensable gas may be produced in the heat pipes, and such an uncondensable gas can be emitted by opening this valve conveniently under the normally running condition of the reformer. In order to enforce the heat transfer, at both the external air side and the external flue gas side of the heat pipes, a plurality of fins (21, 24) are disposed.

The area ratio between the fins of the cold side and the hot-side of the heat pipes can be regulated according to the demand to control the temperature of the pipe wall, which should be ensured to prevent superheated or supercooled to dew-point so as to avoid dew-point corrosion and dust choke.

According to this invention, a plurality of dust blowers (25) are disposed around the heat pipe exchanger to prevent the superheat of the heat pipes and the formation of dew. Besides, between the heat pipes and the upper, middle plates, sealing plates (26) are disposed respectively, sealed by glue, so that the leakage of gas can be effectively prevented and the assemble and disassemble of the heat pipe exchanger will be convenient and reliable.

Because there is a plurality of burners (22) on the radiation section of the primary reformer, the temperatures at the top of the reformer is high. As a result, the heat is dispersed as a loss on one hand, the temperature of the operating space above the top of the reformer is also high on the other hand, and the working environment will be deteriorated as well. According to this invention, a plurality of passageways (6,6') is formed respectively on the opposite outside walls of the reformer by a plurality of arc-shaped steel sheet or zinc-plated steel sheets, a steel sheet or zinc-plated steel sheet sealing cover (17,17') is welded on the top of the passageway (6,6'), at least one air inlet (5,5') is disposed at the inner side of the sealing cover (17,17').

In this way, the air inlet (5,5') is disposed at the top of the reformer. When the blower (7) is on, the air above the top of the reformer can be introduced in, and take off the heat dispersed by the reformer body, so as to reduce the temperature of the operating space at the top of the reformer top and to improve the working condition.

In the following paragraphs, the flow chart of the system for recovery and utilization of the exhaust heat from a reformer will be described with reference to the accompanying figures.

As shown in FIG. 5, when the reformer is working, the fresh air above the reformer top is introduced by the blower (7) from the air inlet (5,5') into the passageways (6,6') and the bottom chamber (16) of the bottom of the reformer. The air absorbs the heat dispersed from the reformer body, reduces the temperature of the operating space at the reformer top, and is delivered to the air inlet (9) of the heat pipe exchanger (8) by the blower (7). After absorbing the heat dispersed from the reformer body, the temperature of the air increases 30°-50° C.;

The high temperature flue gas produced by fuel combustion in the reformer is mixed with the glue gas produced in the auxiliary boiler in the convection section (2), and the flue gas mixture is drawn by flue gas fan (4), then makes heat exchange with the working substance in the lower part of the heat pipe exchanger (8), which is disposed in the flue duct between the flue gas fan (4) and the outlet of the convection section (2), and the working substance is vaporized. The vapor of the working substance goes up to the upper part of the heat pipes of the exchanger (8). The vapor makes heat exchange with the preheated air from the passageway (6,6') and the bottom chamber (16). After that, the temperature of the flue gas falls down from 300° C. to about 160° C., and is drawn out by the fan (4), emits through the chimney (11) to the atmosphere; the temperature of the air rises up to about 220° C., one part of which goes to the auxiliary boiler for combustion, and another part of which goes to the reformer body for combustion.

The system for recovery and utilization of the exhaust heat from the reformer according to the present invention can be used not only for primary reformer, but also for the recovery and utilization of the exhaust heat of industrial boiler, domestic boiler, etc.

According to this invention, the system for recovery and utilization of the exhaust heat from the reformer, uses the device for recovering the heat dispersed from the reformer body and the device for recovering the exhaust heat of the flue gas; in comparison with the rotary air pre-heater, has the following advantages:

1. Larger amount of recovered heat, effectiveness in the saving of the energy.

By using the system for recovery and utilization of exhaust heat of this invention, if the temperature of the atmosphere air is 12° C. after the preheating according to the system of the present invention, its temperature can rise up to 228° C., the amount of recovering heat is about 52.6 KJ/hr, the saving of the light diesel oil is 1230 kg/hr;

2. Eliminating the leakage on the devices; without moving parts; low heat loss, the pressure drop at air side is less than 300 Pa, at flue gas side, the pressure drop is less than 600 Pa;

3. Avoiding the dew-point corrosion and the dust choke; simplicity in construction; convenience in maintenance; good reliability;

4. Reduction of the temperature of the operating space at the reformer top; amplitude of reduction is up to 20° C.; improvement of operating environment.

What is claimed is:

1. A system for recovery and utilization of exhaust heat from a reformer, comprising a device for recovering heat dispersed from a reformer body; and a device for recovering exhaust heat of flue gas, said device for recovering the heat dispersed from the reformer body comprising:

a convection section having a flue gas outlet; at least one blower; a plurality of arc-type passageways being formed on opposite outside walls of the reformer body by a plurality of arc-shaped steel sheets or zinc-plated steel sheets respectively, a steel or zinc-plated steel sheet sealing cover being welded on top of said passageways; at least one air inlet being disposed at an inner side of said sealing cover, said arc-type passageways being connected respectively with a bottom chamber of the reformer body and extending to the convection section; and an air outlet being disposed at the convection section and connected with said blower;

said device for recovering of the exhaust heat of the flue gas comprising:

a flue gas fan; a flue duct, a preheated air duct having an inlet and an outlet; a heat pipe exchanger being disposed in the flue duct between the flue gas outlet of the convection section and the flue gas fan, a lower part of the heat pipe exchanger being disposed in the flue duct, an upper part of which being disposed in the preheated air duct; the inlet of the said preheated air duct being connected with said blower, and the outlet of said preheated air duct being connected with combustion air inlets of the reformer and an auxiliary boiler.

2. A system according to claim 1 characterized in that said heat pipe exchanger is made of carbon steel-water heat pipes and a seal exhaust valve is disposed on said pipes.

3. A system according to claim 2 characterized in that both cold and hot parts of the heat pipes are provided with fins, thread pitches of the fins are different at different parts, an area ratio between the fins of both parts can be regulated according to demand.

4. A system according to claim 1, wherein said system includes a plurality of dust blowers and said heat pipe exchanger includes a plurality of heat pipes, wherein said system is characterized in that each of said dust blowers is disposed between two of said heat pipes.

5. A system according to claim 1 characterized in that both flue gas duct and air duct for disposing the heat pipe exchanger have variable cross sections.

6. A system according to claim 2 characterized in that a plurality of sealing plates are disposed respectively between heat pipes and upper, middle plates, and sealed by glue to prevent leakage of the gas.

7. A system according to claim 1 characterized in that said arc-type passageways and said bottom chamber of the reformer are provided with at least one emergency valve, which can be opened automatically for admitting air entering and cooling reformer walls during a sudden stop of the blower.

* * * * *

UNITED STATES PATENT AND TRADEMARK OFFICE
CERTIFICATE OF CORRECTION

PATENT NO. : 5,226,477

DATED : July 13, 1993

INVENTOR(S) : Hanlong Yuan, et al.

It is certified that error appears in the above-identified patent and that said Letters Patent is hereby corrected as shown below:

TITLE PAGE

[75] Inventors: delete "Yigang Yang and Zuowei Hu" and insert ---Zengrun Sun and Bing Yang---.

Column 1, line 52, after "plates" delete "increase" and insert ---increases---;

Column 4, line 26 (See Amendment dated August 6, 1992), delete "(22)" and insert therefor ---(23)---;

Column 5, line 19, delete "glue" and insert therefor ---flue---; and

Column 5, line 48, delete "effectivness" and insert therefor ---effectiveness---.

Signed and Sealed this

Eighth Day of March, 1994

Attest:

BRUCE LEHMAN

*Attesting Officer*  *Commissioner of Patents and Trademarks*